(12) United States Patent
Allarie (10) Patent No.: US 11,002,400 B2
(45) Date of Patent: May 11, 2021

(54) PIPING INSULATION INSERT (71) Applicant: John Allarie, Ottawa (CA)

(72) Inventor: John Allarie, Ottawa (CA)

( * ) Notice: Subject to any disclaimer, the term of this patent is extended or adjusted under 35 U.S.C. 154(b) by 137 days.

(21) Appl. No.: 16/408,311

(22) Filed: May 9, 2019

(65) Prior Publication Data

US 2019/0264860 A1 Aug. 29, 2019

Related U.S. Application Data

(63) Continuation-in-part of application No. 15/293,027, filed on Oct. 13, 2016, now abandoned.

(51) Int. Cl.
*F16L 59/135* (2006.01)
*F16L 59/14* (2006.01)
*F16L 3/133* (2006.01)

(52) U.S. Cl.
CPC ............. *F16L 59/135* (2013.01); *F16L 3/133* (2013.01); *F16L 59/14* (2013.01); *F16L 59/143* (2013.01)

(58) Field of Classification Search
CPC .................................................... F16L 59/135
USPC ................................................ 138/106, 107
See application file for complete search history.

(56) References Cited

U.S. PATENT DOCUMENTS

| | | | |
|---|---|---|---|
| 1,153,159 A | 9/1915 | Gray | |
| 2,352,145 A | 6/1944 | Wright | |
| 5,078,346 A | 1/1992 | Deichman | |
| 5,192,039 A | 3/1993 | Williams | |
| 5,381,833 A | 1/1995 | Cummings et al. | |
| 5,924,656 A | 7/1999 | Okada et al. | |
| 6,283,158 B1 | 9/2001 | Botsolas et al. | |
| 7,207,527 B2 | 4/2007 | Opperthauser | |
| 7,261,256 B2 | 8/2007 | Pattie et al. | |
| 7,328,724 B2 | 2/2008 | Britton | |
| 7,677,505 B2 | 3/2010 | Deichman | |
| 7,770,341 B2 | 8/2010 | Fox | |
| 8,726,607 B1 | 5/2014 | Kirschner | |
| 9,052,038 B2 | 6/2015 | Radzik | |
| 9,140,386 B2 | 9/2015 | Keyes | |
| 2009/0178723 A1 | 7/2009 | Cioffi | |
| 2012/0181413 A1 | 7/2012 | Steinhorst et al. | |

*Primary Examiner* — Craig M Schneider
*Assistant Examiner* — David R Deal
(74) *Attorney, Agent, or Firm* — Greer, Burns & Crain, Ltd.

(57) ABSTRACT

A piping insulation insert that may be inserted in a cut-away portion of insulation wrapping a pipe, wherein the piping insulation insert supports the weight of the pipe against a system by which the insulated pipe is suspended and supported. The insert includes: a length of unistrut having a u-shaped cross-sectional profile, wherein: the exterior surface of the u-shaped unistrut is covered with a first insulating material; a volume defined by the interior surface and the two upper edges of the u-shaped unistrut is packed with a second insulating material; and the two upper edges of the u-shaped unistrut are covered with the first insulating material.

14 Claims, 7 Drawing Sheets

PIPING INSULATION INSERT

CROSS-REFERENCE TO RELATED APPLICATIONS

This application claims the benefit of priority under 35 U.S.C. 120 as a continuation-in-part of U.S. patent application Ser. No. 15/293,027 filed Oct. 13, 2016 entitled "Piping Insulation Insert," the entire contents of which are incorporated herein by reference.

FIELD OF INVENTION

This invention relates to a piping insulation insert, and more particularly to an insulated support insert for use in installation of suspended pipe or ductwork.

BACKGROUND

Piping or ductwork is used to move a liquid or gas from one site to another. Often the liquid or gas is either heated or chilled, relative to the surroundings of the piping or ductwork, and the piping or ductwork is insulated by surrounding insulation to help maintain the temperature of the liquid or gas within the piping or ductwork and minimize the transfer of heat between the interior and the exterior of the piping or ductwork. For the sake of brevity, the term "piping" will be used throughout this specification to refer to both piping and ductwork.

In a construction, such as a building, piping is often suspended via a system of supports. So long as the piping is adequately insulated, heat transfer between the liquid or gas within the piping and the individual supports within the system of supports is minimized. However, piping can often be heavy when it is carrying liquid or gas, and unwanted heat transfer can occur when insulation is compressed between piping and the underlying supports in the system of supports.

One way of minimizing this heat transfer is to use insulation that is minimally compressible, but this is easier said than done. For example, in the past, asbestos-containing plaster-type insulation was used to coat pipes. This type of insulation was fairly robust and minimally compressible, but it is now known that asbestos is a health hazard and its use is avoided. Calcium silicate is not really an adequate alternative to asbestos for use as weight-bearing insulation since it will become brittle and fail over time. Minimally compressible foam insulation has been found to be an inadequate form of weight-bearing insulation for long-term use since it too will deteriorate over time, become brittle, and eventually crack.

One solution has been to remove a piece of the insulation that surrounds the pipe between the pipe and the underlying support by cutting away a small block of insulation and inserting in its place a small piece of stronger material. The small piece of stronger material sits in the recess cut away from the insulation such that the small piece bears the weight of piping on the underlying support. However, with the removal of the piece of insulation, heat can transfer directly from the piping, through the small piece of stronger material to the underlying support.

If the material being transported in the piping is colder than the temperature of the surroundings, the transported material will become less cold and the underlying support will become colder, thereby encouraging water condensation on the underlying support. This water condensation will migrate to the insulation and drop on any structure underneath the underlying support, which will encourage undesirable rot of the structure underneath and mold growth in the insulation. Over time, if water condensation continues, the small piece of stronger material and the underlying support may rot, or corrode if made of metal.

If the material being transported in the piping is warmer than the temperature of the surroundings, the transported material will lose heat through the stronger piece of material to the underlying support. Over time, this heat transfer may weaken the small piece and the underlying support and cause one or both to fail. If the heat transfer is significant enough, it may even be a fire hazard or at least be a hazard to a person who touches the underlying support or a structure close to the underlying support.

Others have attempted to implement the solution of using a small block of stronger material by using a wood block as the small piece of stronger material. Commercial examples have been made by Buckaroos Inc. of Indianapolis, Ind., USA as wooden blocks and dowels. However, wood can fail. Piping carrying a liquid such as chilled or heated water can be heavy, especially if the length of piping is significant, the gauge of the piping is thick, the cross-sectional area of the piping is large and/or the piping is made of a heavy material, such as a metallic material. Wood will not necessarily stop condensation and can become wet in this application. Over time, wet wood will rot and fail under a heavy load. If wood is heated, it will dry out and can become brittle. Brittle wood will also fail over time and if heated, over time, may be a combustion hazard. Another drawback to wood is that it is not a consistent product—the strength, compressibility and density of wood can vary with the species of tree and growing conditions of where the tree was raised. The ability of wood to be consistently strong and insulative cannot be predicted or measured.

Another commercial solution made by Buckaroos Inc. is a molded fiberglass insulation block; however, the molded fiberglass insulation block may not be an adequate solution. If the piping is heavy, the block can deform, crack and eventually fail.

What is needed is a piping insulation insert that is strong, rigid and insulative in a consistent, predictable and measurable manner.

SUMMARY

According to one aspect of the present invention, there is provided a piping insulation insert comprising: a length of unistrut having a u-shaped cross-sectional profile in a face perpendicular to the length of the u-shaped unistrut, wherein the u-shaped unistrut is formed of a rigid material and comprises a base portion and two arm portions extending upwardly therefrom to form the u-shaped cross-sectional profile, the base and arm portions defining an interior and an exterior surface of the u-shaped unistrut with each of the interior and exterior surfaces extending the length of the u-shaped unistrut, and two upper edges of the u-shaped unistrut defined by end points of each of the two arm portions furthest away from the base portion, each of the two upper edges extending the length of the u-shaped unistrut with each of the two upper edges separating the interior surface from the exterior surface, wherein: the exterior surface of the u-shaped unistrut is covered with a first insulating material; a volume defined by the interior surface and the two upper edges of the u-shaped unistrut is packed with a second insulating material; and the two upper edges of the u-shaped unistrut are covered with the first insulating material.

In one embodiment, there is provided the piping insulation insert described herein wherein the rigid material is metallic.

In another embodiment, there is provided the piping insulation insert described herein wherein the first insulating material is the same as the second insulating material.

In yet another embodiment, there is provided the piping insulation insert described herein wherein the first insulating material and the second insulating material is an elastomeric foam insulation.

In still another embodiment, there is provided the piping insulation insert described herein wherein the first insulating material is different from the second insulating material.

In a further embodiment, there is provided the piping insulation insert described herein wherein the first insulating material is an insulating fabric made of plain weave high temperature treated fiberglass and the second insulating material is high temperature mineral wool insulation.

DETAILED DESCRIPTION

Figure 1:
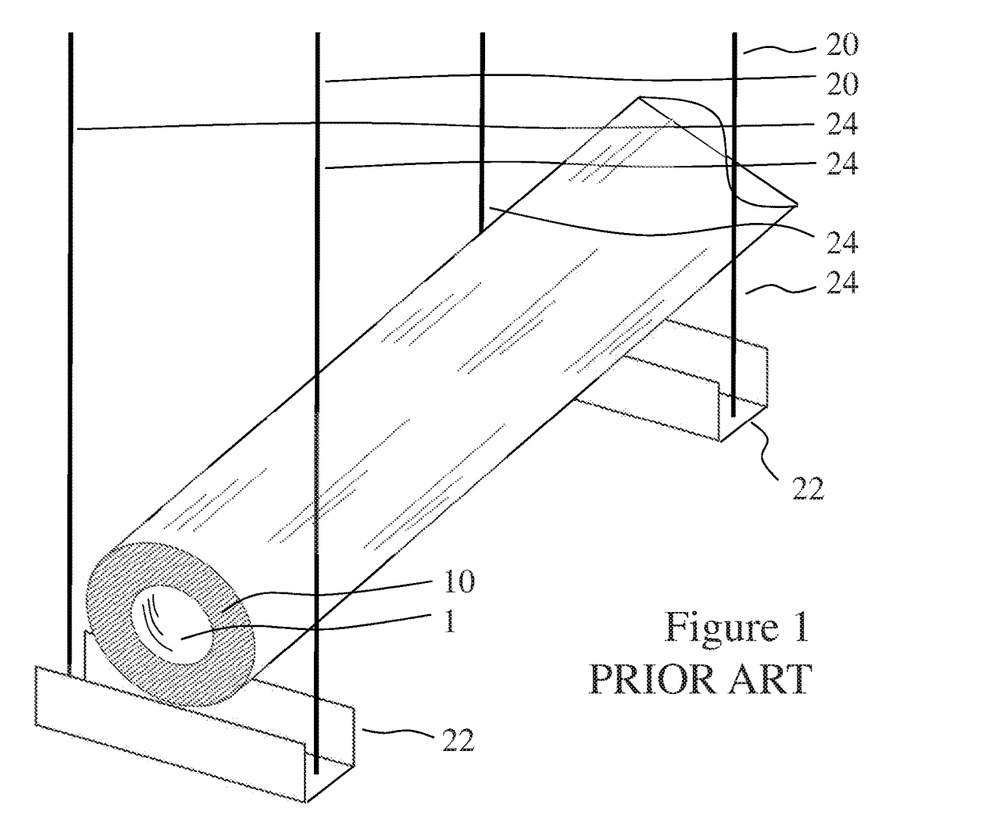
FIG. 1 is a perspective view, partially in cross section, of a length of insulated piping supported by two pieces of suspended unistrut support (Prior Art).
Figure 2:
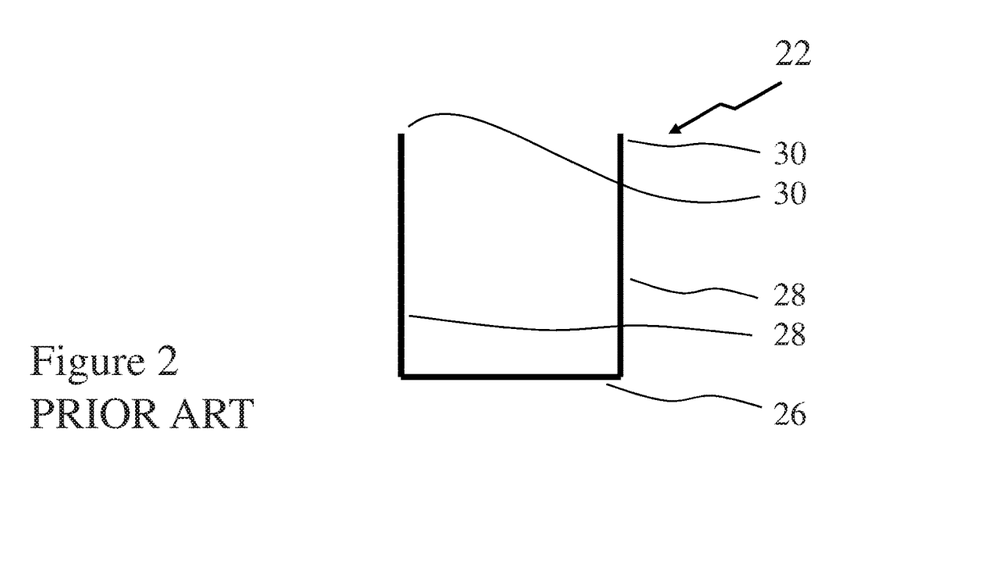
FIG. 2 is a side elevational view of one of the pieces of unistrut support shown in FIG. 1 (Prior Art).

FIG. 1 illustrates an example of a length of piping, surrounded by insulation, and suspended via a system of supports. In this example, a single length of pipe 1 is surrounded by a layer of insulation 10, and the system of supports 20 consists of multiple pieces of rigid unistrut 22, each of which is suspended by two threaded metal rods 24. Each piece of unistrut 22 is made of a rigid material, such as steel or aluminum, and has a u-shaped cross-sectional profile, as shown in FIG. 2, with a lower base portion 26 and two arm portions 28 extending upwardly therefrom. Each of the two arm portions 28 terminates at an upper edge 30.

In the example of FIG. 1, each piece of unistrut 22 is suspended from two threaded metal rods 24 which protrude from two holes (not shown) placed through the base portion 26 of unistrut 22, with one hole toward each end of unistrut 22. Each threaded rod 24 is secured to unistrut 22 by two nuts (not shown), one above the base portion 26 of unistrut 22, and one below the base portion 26 of unistrut 22.

In the example of FIG. 1, a single length of pipe 1, surrounded by a layer of insulation 10, is suspended from the system of supports 20, but in constructions multiple lengths of pipe 1, each of which is surrounded by a layer of insulation 10, may be suspended from the system of supports 20, by longer pieces of unistrut 22 and laying the multiple lengths of pipe 1 side-by-side. Although each length of pipe 1 is often heavy enough to be held in place along the length of unistrut 22 through the force of gravity, each length of pipe 1 may sit within a concave saddle or shield (not shown).

The person skilled in the art will be familiar with other methods of suspending insulated pipe, but the method of the example shown in FIG. 1 is illustrative of the problem presented earlier. The weight of pipe 1 will place a compressive force between the underside thereof and the underlying system of supports 20 (in the example shown in FIG. 1, at the upper edge of unistrut 22). In the example shown in FIG. 1 the layer of insulation 10 is not shown to be compressed because the layer of insulation 10 is a minimally compressible layer of asbestos-containing plaster-type insulation that was used in the past. As discussed previously, insulation that is used in modern piping systems is compressible, and compressible insulation loses effectiveness when compressed.

Figure 3:
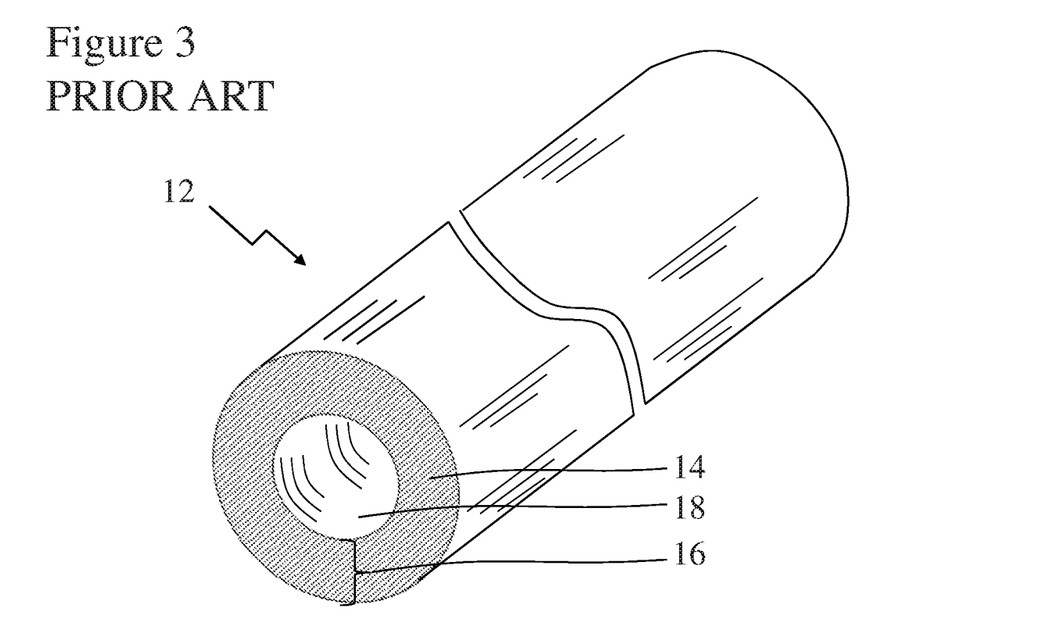
FIG. 3 is a perspective view of a piece of insulation used to coat a length of piping (Prior Art).

Insulation for piping can come in preformed sections. FIG. 3 illustrates an example of such a preformed section 12. Section 12 takes the form of a tube with a hollow core 18 surrounded by a layer of insulation 14. Section 12 is sliced open along its length so that it may be placed around a length of piping so that the length of piping sits in the hollow core 18. Section 12 is manufactured so that the diameter of hollow core 18 matches that of the diameter of piping to be insulated. The portion of the layer of insulation 14 that may be subject to compression when piping is suspended as discussed above is shown at 16. As discussed above, a piece of the insulation that surrounds the pipe and the underlying support in this region may be removed and replaced with a small piece of stronger material. This small piece of stronger material is referred to herein as a piping insulation insert, and the piping insulation insert of the present invention will now be described.

Figure 7:
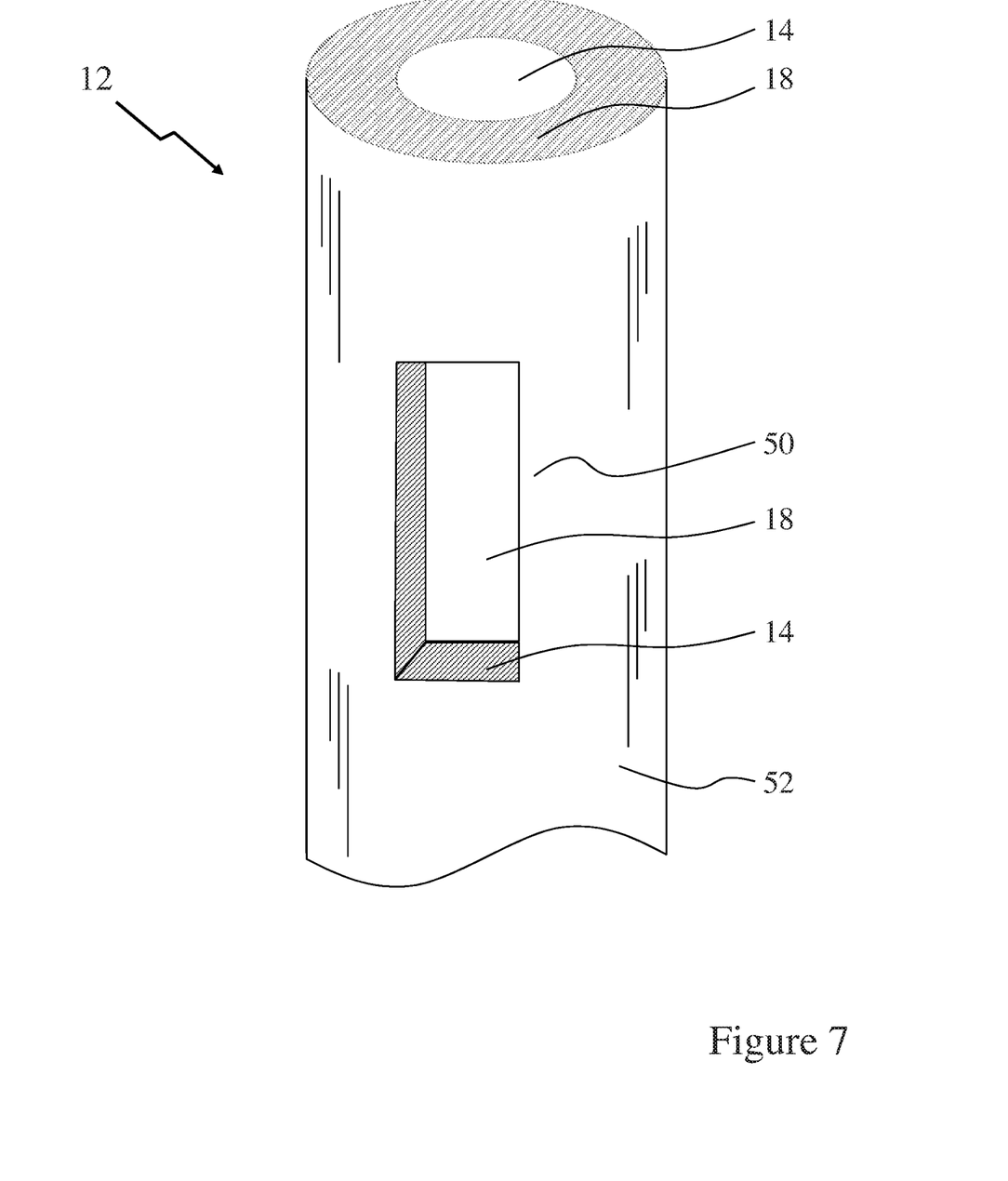
FIG. 7 is a perspective view of a piece of insulation used to coat a length of pipe with a piece cut away for installation of the piping insulation insert of the present invention.

The underside of a section of insulation from which a portion has been cut away is shown in FIG. 7. Cut out portion 50 is seen on the underside 52 of section 12. Cut out portion 50 extends through the layer of insulation 14, exposing hollow core 18. The piping insulation inset of the present invention is sized to match the size of cut out portion 50.

Figure 4A:
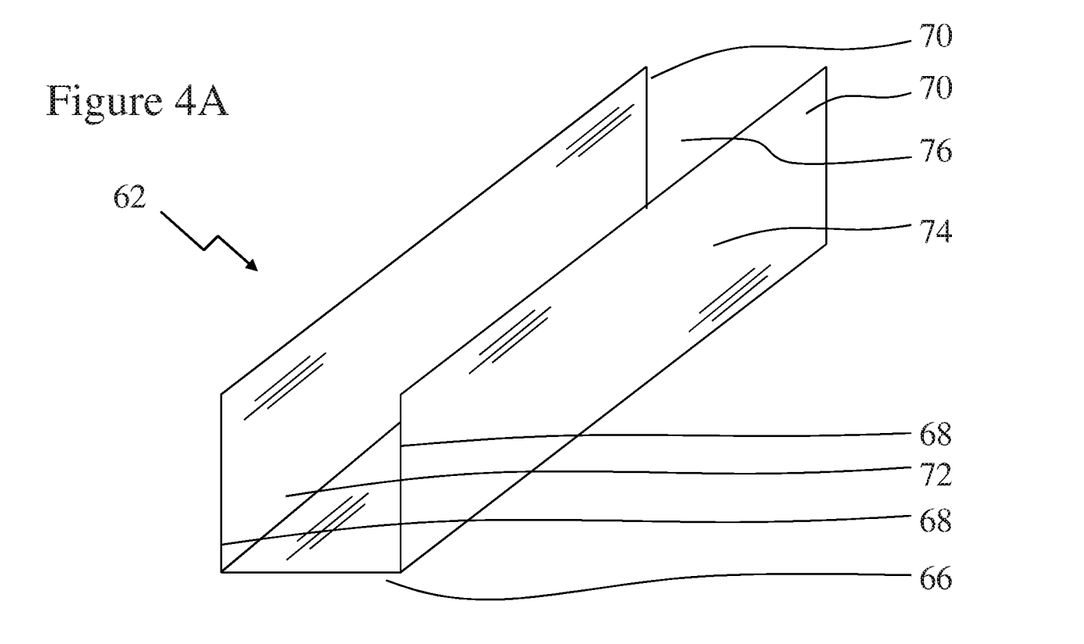
FIGS. 4A and 4B are perspective views of an embodiment of the piping insulation insert of the present invention, partially assembled.

The piping insulation insert of the present invention is formed from a length of unistrut 62, as shown in FIG. 4A. The unistrut 62 may be made of the same material as unistrut 22 of the system of supports 20 in FIG. 1, however, unistrut 62 may be sized differently, for the reasons discussed below, in order that the piping insulation insert of the present invention be sized to match the size of cut out portion 50.

Unistrut 62 is made of a rigid material that will support the weight of piping 1 when resting in system of supports 20. Rigid material should be durable so that it will maintain its integrity over time while under weight-bearing load. In one embodiment, unistrut 62 is made of metal, such as steel or aluminum. Unistrut 62 is u-shaped, when viewed in cross-section, with lower base 66 and two arms 68 projecting upwardly therefrom. In the embodiment shown in FIG. 4, base 66 is flat, but base 66 may also have a convex bend to match that of the saddle of the system of support in which the insulated piping is to rest and the radius of preformed section of insulation 12. Each upwardly projecting arm 68 terminates at the upper end thereof, forming two upper edges 70 running along the length of unistrut 62. Unistrut 62 has an interior surface 72, and an exterior surface 74, with the two upper edges 70 being the borders between the interior surface 72 and the exterior surface 74. When u-shaped unistrut 62 is viewed in cross-section, interior surface 72 is the inside surface of the "u", and exterior surface 74 is the outside surface of the "u".

Figure 5:
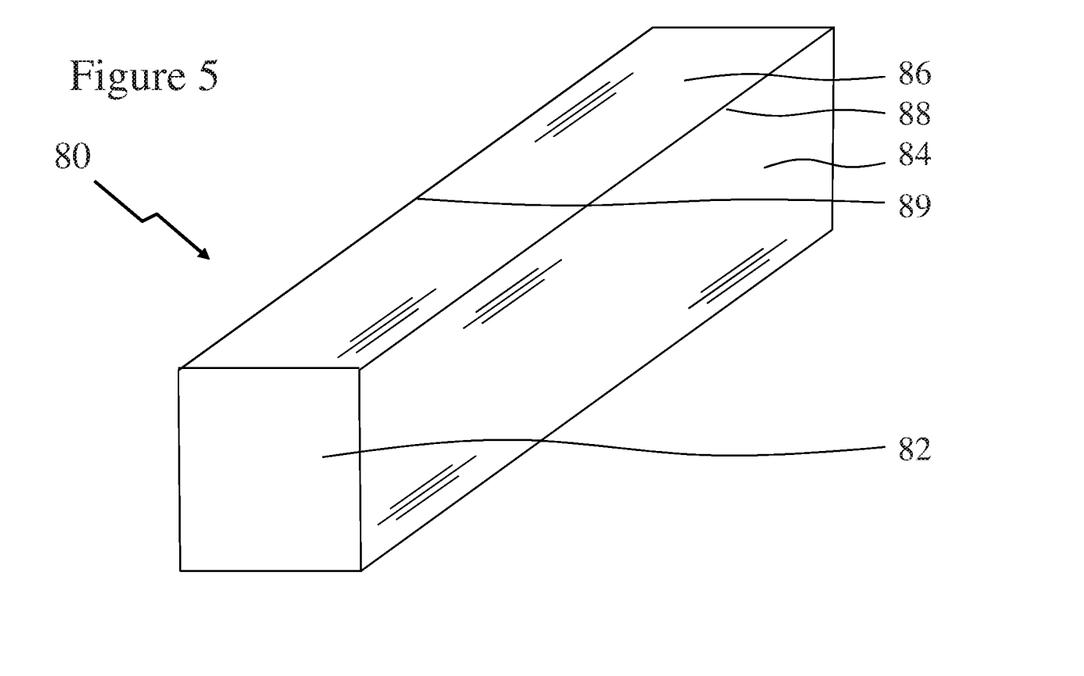
FIG. 5 is a perspective view of a fully assembled embodiment of the piping insulation insert of the present invention.
Figure 6:
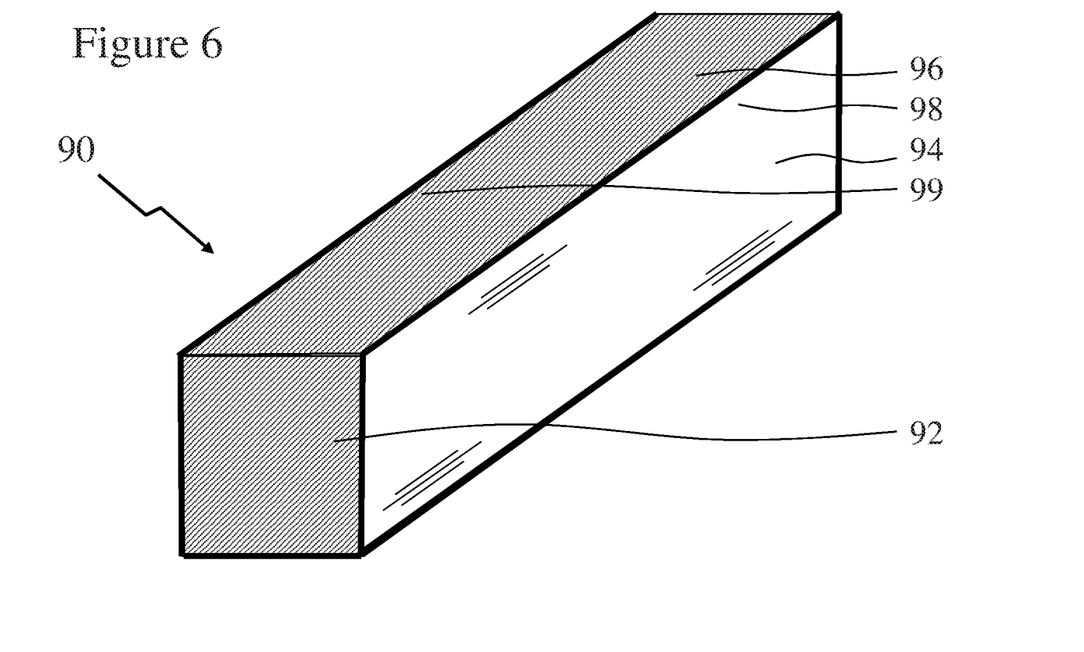
FIG. 6 is a perspective view of a fully assembled embodiment of the piping insulation insert of the present invention that is different than the embodiment shown in FIG. 5.

One embodiment of the piping insulation insert of the present invention is shown in FIG. 5 and a second embodiment of the piping insulation insert of the present invention is shown in FIG. 6.

Figure 4B:
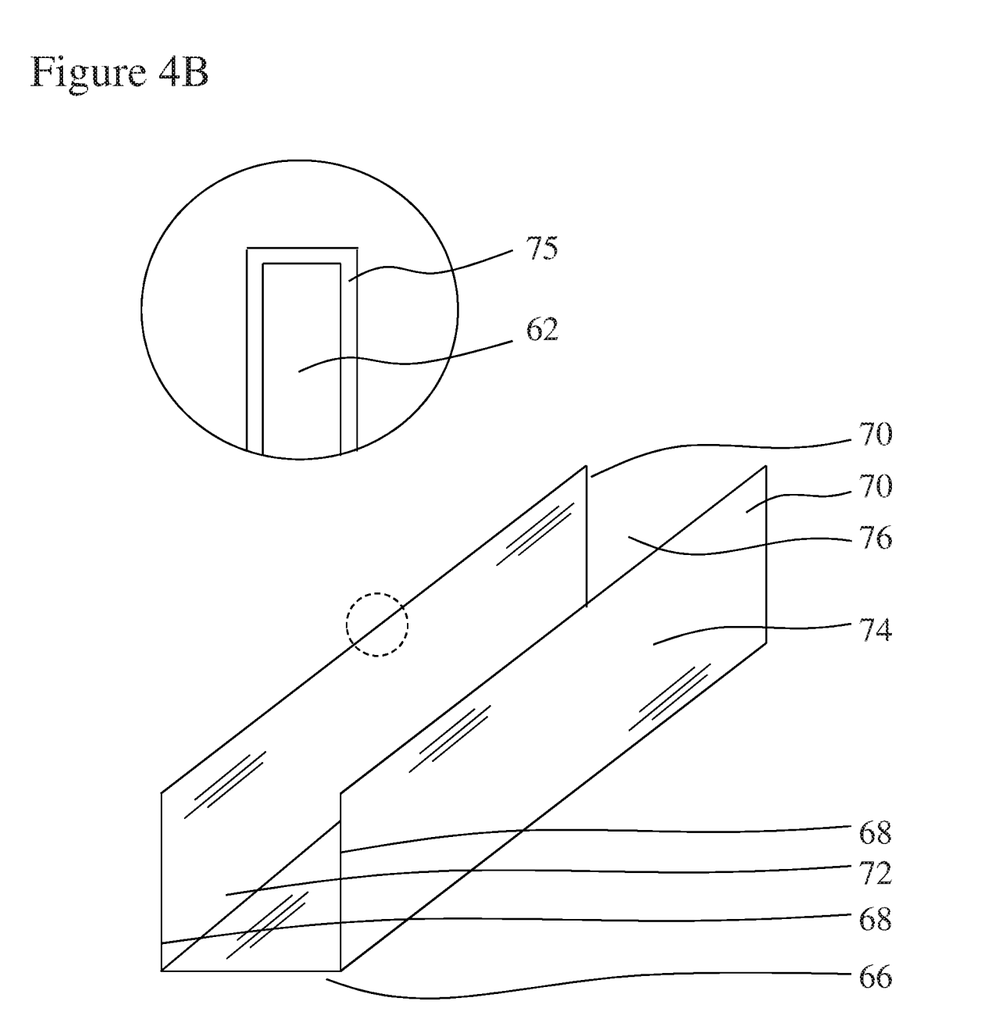

In each of these two embodiments, the piping insulation insert is formed by applying insulation to unistrut 62 as depicted in FIG. 4B. Exterior surface 74 is wrapped with a first insulating material. A sheet of the first insulating material is adhered to interior surface 72, wrapped over the one upper edge 70, placed over the exterior surface 74, wrapped over the second upper edge 70, and adhered to interior surface 72. When wrapped with the sheet of first insulating material, the exterior surface 74 of unistrut 62 is covered, but the interior surface 72 of unistrut 62 need not be completely covered. What is important is that exterior surface 74 and both upper edges 70 of unistrut 62 be covered with the first insulating material. Construction of the piping insulation insert is then completed by filling the volume 76 defined by the interior surface of the u-shaped unistrut 62, extending up to the upper edges 70 of the unistrut 62, with a second insulating material. Volume 76 of the length of unistrut 62 is packed with the second insulating material from base 66 up to a surface defined by the two edges 70, which may be thought of the upper surface of the u-shape of unistrut 62.

The first insulating material may be the same as the second insulating material, or it may be different.

FIG. 5 illustrates a piping insulation insert 80 where the first insulating material is the same as the second insulating material. In this embodiment of the invention, piping insulation insert 80 appears as a block of insulating material. FIG. 5 is a perspective view, so only the front 82, right side 84, and top 86 surfaces of the piping insulation insert 80 are visible. Right side surface 84, as well as edges 88 and 89, are covered by the sheet of first insulating material that has been wrapped around exterior surface 74 of unistrut 62. Although unseen in the perspective view of FIG. 5, the lower surface (opposite top surface 86), and left side surface (opposite right side surface 84) are also covered by the sheet of first insulating material that has been wrapped around exterior surface 74 of unistrut 62. Front surface 82 and top surface 86 are formed of the second insulating material, being the front and top surfaces of the volume 76 of unistrut 62 (seen in FIG. 4) that have been packed with second insulating material. Although unseen in the perspective view of FIG. 5, the back surface (opposite front surface 82) is also formed of the second insulating material, being the back surface of the volume 76 of unistrut 62 (seen in FIG. 4) that has been packed with second insulating material. Because the first and second insulating materials are the same, piping insulation insert 80 of this embodiment appears as a block of one insulating material.

FIG. 6 illustrates a piping insulation insert 90 where the first insulating material is different than the second insulating material. In this embodiment of the invention, piping insulation insert 90 also appears as a block of insulating material but two different insulating materials will be seen if the first insulating material has a different appearance to the second. Like FIG. 5, FIG. 6 is a perspective view, so only the front 92, right side 94, and top 96 surfaces of the piping insulation insert 90 are visible. Right side surface 94, as well as edges 98 and 99, are covered by the sheet of first insulating material that has been wrapped around exterior surface 74 of unistrut 62. Although unseen in the perspective view of FIG. 6, the lower surface (opposite top surface 96), and left side surface (opposite right side surface 94) are also covered by the sheet of first insulating material that has been wrapped around exterior surface 74 of unistrut 62. Front surface 92 and top surface 96 are formed of the second insulating material, being the front and top surfaces of the volume 76 of unistrut 62 (seen in FIG. 4) that have been packed with second insulating material. Although unseen in the perspective view of FIG. 6, the back surface (opposite front surface 92) is also formed of the second insulating material, being the back surface of the volume 76 of unistrut 62 (seen in FIG. 4) that has been packed with second insulating material.

Figure 8:
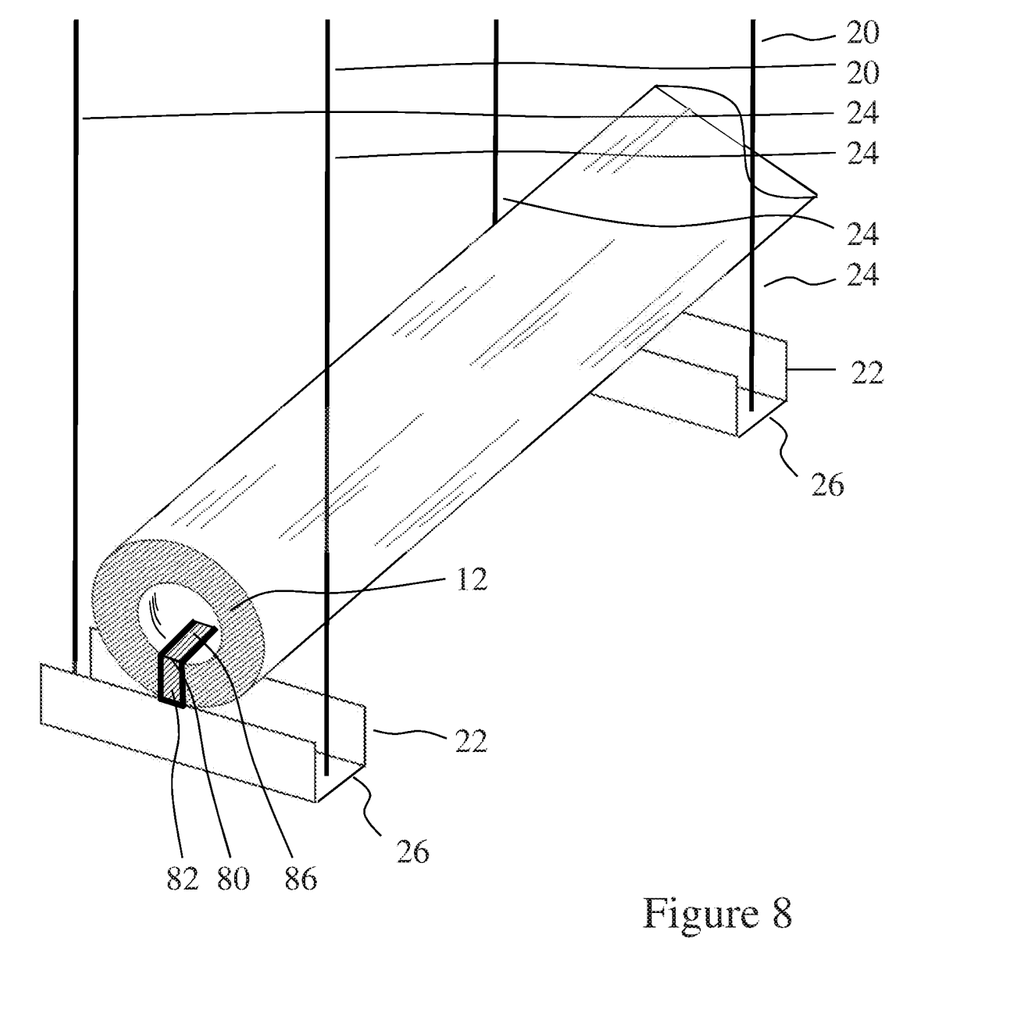
FIG. 8 is a perspective view, partially in cross section, of a length of insulated piping in which the piping insulation insert of the present invention has been inserted, supported by two pieces of suspended unistrut support.

Both piping insulation insert 80 and 90 are used in the same manner. FIG. 7 illustrates a preformed section 12 of piping insulation from which a portion 50 has been cut out from the underside 52 thereof. Cut out portion 50 is sized to match that of the top surface 86 or 96 of piping insulation insert 80 or 90, respectively. The positioning of piping insulation insert 80 is shown in FIG. 8, and the positioning of piping insulation insert 90 would be the same. The view shown in FIG. 8 is analogous to the view shown in FIG. 1 of a prior art system of hanging insulated pipe without a piping insulation insert, except if FIG. 8, the piping sitting within the insulation is not shown, so the positioning of piping insulation insert may better be seen.

In the example of FIG. 8, a single length of pipe (not shown), surrounded by preformed sections of piping insulation 12 prepared in the manner as described above and shown in FIG. 7, is suspended from a system of supports 20. Each support 20 consists of a piece of unistrut 22 suspended from two threaded metal rods 24 which protrude from two holes (not shown) placed through the base portion 26 of unistrut 22, with one hole toward each end of unistrut 22. Each threaded rod 24 is secured to unistrut 22 by two nuts (not shown), one above the base portion 26 of unistrut 22, and one below the base portion 26 of unistrut 22. Top surface 86 of piping insulation insert 80 is positioned adjacent to pipe (not shown) sitting within the sections of piping insulation 12. Piping insulation insert 80 is sized so that the height of the front surface 82 thereof matches the thickness of the sections of piping insulation 12. In operation, piping insulation insert 80 will support the weight of the pipe sitting within the insulation without the thickness of piping insulation being compressed.

Figure 9:
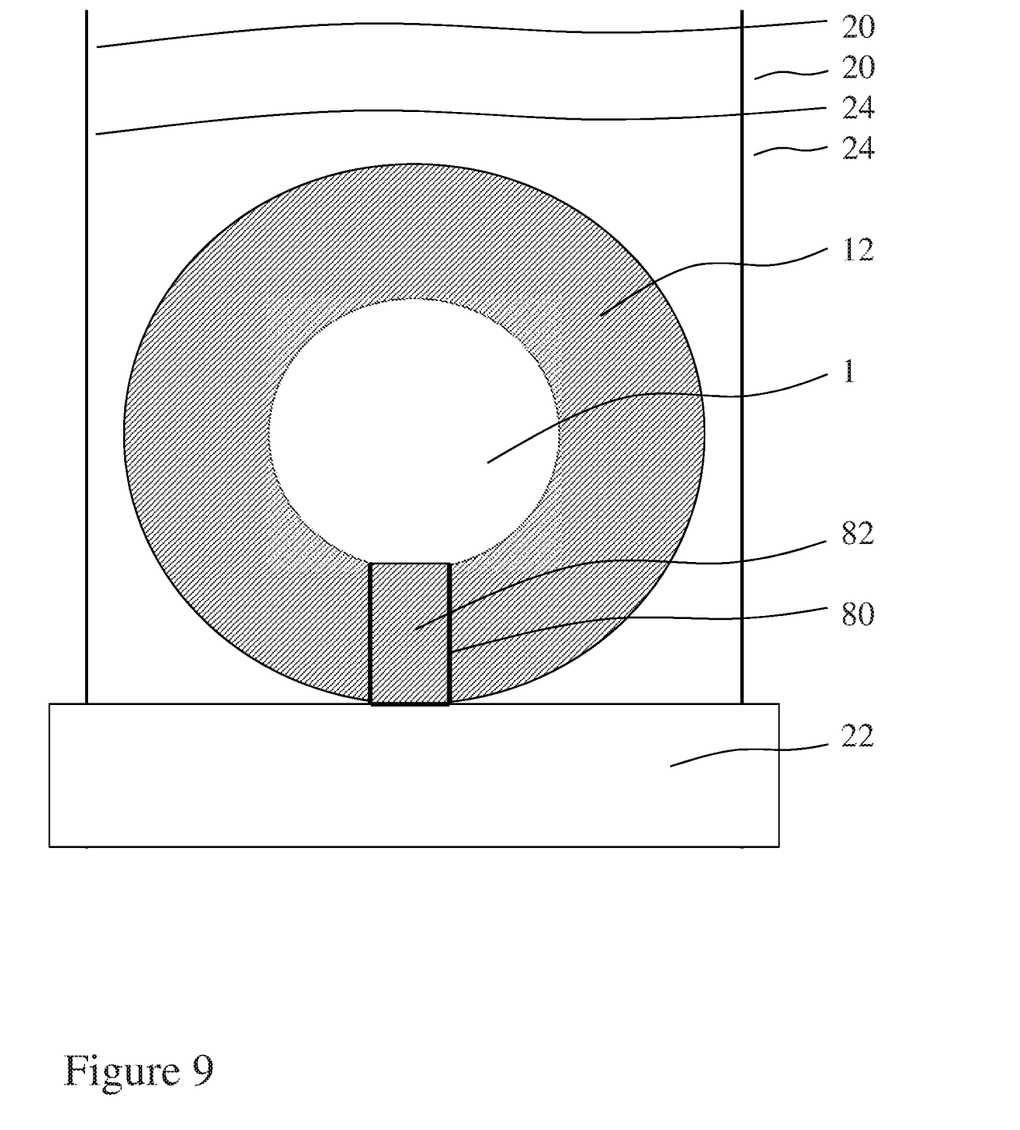
FIG. 9 is a front elevational view, in cross-section, of the supported length of insulated piping seen in FIG. 8.

How piping insulation insert 80 supports the weight of the pipe is better seen in FIG. 9, which is a cross-sectional view of the system shown in perspective view in FIG. 8. System of supports 20 comprises unistrut 22 suspended by two threaded metal rods 24. Pipe 1 is surrounded by section of insulation 12, and piping insulation insert 80 is seen between the bottom surface of the pipe 1 and the top edge of the unistrut 22 of the system of supports 20. The height of the front face 82 of the piping insulation support is equal to the thickness of the insulation in the section of insulation 12, and the section of insulation 12 is not compressed by the weight of the pipe since piping insulation insert 80 supports the weight of the pipe.

Because the unistrut 62 inside of piping insulation insert 80 or 90 has its upper edges 70 and exterior surface of base 66 covered by the first insulating material, there is no direct contact between the outer surface of pipe 1, the unistrut 62 inside the piping insulation insert 80 or 90 and the unistrut 22 of the system of supports 20. The transfer of heat or cold from the inside of pipe 1 to the unistrut 22 of the system of supports 20 through unistrut 62 inside the piping insulation insert 80 or 90 is minimized due the barrier of the first insulating material in the piping insulation insert 80 or 90.

For example, pipe carrying a chilled liquid may be insulated with a layer of elastomeric thermal insulation. An insulation of this type is commercially available under the trade name AP/Armaflex® from Armacell LLC of Mebane, N.C., U.S.A The closed cell structure of elastomeric insulation effectively retards the flow of moisture vapor and is considered a low-transmittance vapor retarder. This elastomeric insulation has a thermal conductivity of 0.27 BTU-in/hr. ft$^{2\circ}$ F., a water vapor transmission of 0.08 per-inch, complies with CAN/ULC S-102 for 25/50 flame spread and smoke development requirements and is rated for usage between −57° C. and +105° C. A piping insulation insert made with AP/Armaflex® insulation as the first and second insulating material has been tested by cutting an opening in the insulation of a pipe coated with AP/Armaflex® insulation to match the size of the piping insulation insert, inserting the piping insulation insert in the opening and foil taping the insert in place using ULC 25/50 flame and smoke rated aluminum foil tape. Cold liquid was run through the pipe without unacceptable levels of transmission of cold to or condensation observed on the structure used to suspend the insulated pipe.

In another example, pipe carrying a heated liquid or gas may be insulated with a layer of insulation made from high temperature mineral wool, wrapped in an external layer of fabric made of plain weave high temperature treated fiberglass. High temperature mineral wool insulation is commercially available under the tradename ROXUL®, such as ROXUL® RHT 60, from Roxul Inc. of Milton, Ontario, Canada. Fabric made of plain weave high temperature treated fiberglass is commercially available under the trade name Alpha-Weld™ style 2025/VCF from Alpha Associates, Inc. of Lakewood, N.J., U.S.A. Insulation comprising a layer of mineral wool of this type, wrapped in an external layer of fabric of this type complies with CAN/ULC S-102 for 25/50 flame spread and smoke development requirements and is rated for usage temperatures of 650° C. maximum. A piping insulation insert made with Alpha-Weld™ style 2025/VCF fabric insulation as the first insulating material and ROXUL® RHT 60 mineral wool as the second insulating material has been tested by cutting an opening in the insulation of a pipe coated with mineral wool wrapped in plain weave high temperature treated fiberglass fabric insulation to match the size of the piping insulation insert, inserting the piping insulation insert in the opening and foil taping the insert in place using ULC 25/50 flame and smoke rated aluminum foil tape. Heated liquid was run through the pipe without unacceptable levels of transmission of heat to or condensation observed on the structure used to suspend the insulated pipe.

While a particular embodiment of the present piping insulation insert has been described herein, it will be appreciated by those skilled in the art that changes and modifications may be made thereto without departing from the invention in its broader aspects and as set forth in the following claims.

What is claimed is:

1. A method for supporting a pipe comprising:
    providing an elongate insulating body formed from a first predetermined material having an exterior profile of first predetermined geometry, an inner profile of a second predetermined geometry to fit around a pipe of predetermined dimensions, and a plurality of openings of predetermined geometry disposed along longitudinally at predetermined locations along a length of the insulating body such that the plurality of openings is aligned along the length of the insulating body; and
    providing a plurality of resilient piping insulation inserts, each resilient piping insulation insert disposed within an opening of the plurality of openings; wherein
    a length of each piping insulation insert along the length of the insulating body is established in dependence upon a length of a support of a plurality of supports along the length of the insulating body upon which the assembly will be disposed when assembled with the pipe;
    a thickness of each piping insulation insert is equal to a thickness of the elongate insulating body at the opening;
    the pipe when assembled with the elongate insulating body and plurality of resilient piping insulation inserts is supported by the plurality of supports via the plurality of resilient piping insulation inserts; and
    each resilient piping insulation insert comprises:
        a central resilient element formed from a second predetermined material having a generally u-shape cross-sectional profile, a length substantially the same as the length of the resilient piping insulation insert, a base of a predetermined width substantially the same as a width of the resilient piping insulation insert, and a height for each of a pair of side walls of the u-shape substantially the same as a thickness of the resilient piping insulation insert;
        a tape formed from a third predetermined material wrapped around at least one or more external surfaces of the central resilient element; and
        a filler formed from a fourth predetermined material filling the central resilient element.

2. The method according to claim 1, wherein the tape also covers at least one of:
    over one or more edges of each side wall of the pair of side walls; and
    one or more internal surfaces of the central resilient element.

3. The method according to claim 1, wherein:
    a base of the generally u-shaped cross-sectional profile is at least one of flat, convex and concave;
    wherein the at least one of flat, convex and concave matches and upper surface profile of the support it sits upon.

4. The method according to claim 1, wherein at least one of:
    the second predetermined material is a metal;
    the elongate insulating body and the plurality of resilient piping insulation inserts comply with an industry standard with respect to at least one of flame spreading and smoke development;
    the plurality of resilient piping insulation inserts is retained in position within the openings within the elongate insulating body by tape.

5. The method according to claim 1, wherein one of:
    the third predetermined material and the fourth predetermined material are either different thermally insulating materials or the same thermally insulating material;
    the first predetermined material, the third predetermined material and the fourth predetermined material are each a thermally insulating material; and the third predetermined material and the fourth predetermined material are each an elastomeric foam material providing thermal insulation.

6. The method according to claim 1, wherein either:
the third predetermined material and the fourth predetermined material are applied to the resilient piping insulation insert prior to its use;
or
the third predetermined material and the fourth predetermined material are applied to the resilient piping insulation when it is manufactured prior to distribution and use.

7. A method of supporting a pipe comprising:
providing a resilient piping insulation insert comprising:
forming a central resilient element from a first predetermined material having a generally u-shape cross-sectional profile, a length substantially the same as a length of the resilient piping insulation insert, a base of a predetermined width substantially the same as a width of the resilient piping insulation insert, and a height for each of a pair of side walls of the u-shape substantially the same as a thickness of the resilient piping insulation insert;
applying a tape formed from a second predetermined material by wrapping the tape around at least one or more external surfaces of the central resilient element; and
applying a filler formed from a third predetermined material by filling the central resilient element with the filler;
providing a pipe;
mounting the pipe onto the resilient piping insulation insert; wherein
the tape has been applied to the resilient piping insulation insert prior to its use; and
the filler has been applied to the resilient piping insulation insert prior to its use.

8. The method according to claim 7, wherein:
mounting the pipe onto the resilient piping insulation insert comprises mounting the pipe onto a plurality of resilient piping insulation inserts of which the resilient piping insulation insert is one;
the plurality of resilient piping insulation inserts is inserted within a plurality of openings of predetermined geometry disposed longitudinally at predetermined locations along a length of an elongate insulating body applied to the pipe prior to mounting;
the elongate insulating body is formed from a fourth predetermined material and has an exterior profile of first predetermined geometry, an inner profile of a second predetermined geometry to fit around a pipe of predetermined cross-section, and comprises the plurality of openings of predetermined geometry; and
the length of the openings and the length of the resilient piping insulation insert are established in dependence upon a length of a support of a plurality of supports upon which the elongate insulating body will be disposed when assembled with the pipe.

9. The resilient piping insulation insert according to claim 8, wherein the thickness of each resilient piping insulation insert is equal to a thickness of the elongate insulating body at the opening.

10. The method according to claim 8, wherein the plurality of resilient piping insulation inserts is retained in position within the plurality of openings within the elongate insulating body by tape.

11. The method according to claim 8, wherein the second predetermined material, the third predetermined material and the fourth predetermined material are each a thermally insulating material.

12. The method according to claim 7, wherein at least one of:
the tape also covers at least one of over one or more edges of each side wall of the pair of side walls and one or more internal surfaces of the central resilient element; and
the base of the generally u-shaped cross-sectional profile is at least one of flat, convex and concave wherein the at least one of flat, convex and concave matches an upper surface profile of a support it sits upon.

13. The method according to claim 7, wherein at least one of:
the first predetermined material is a metal;
the resilient piping insulation insert complies with an industry standard with respect to at least one of flame spreading and smoke development.

14. The method according to claim 7, wherein the second predetermined material and the third predetermined material are either different thermally insulating materials, the same thermally insulating material, or elastomeric foam materials providing thermal insulation.

* * * * *